US011634622B2

(12) United States Patent
Rissi Torres et al.

(10) Patent No.: US 11,634,622 B2
(45) Date of Patent: Apr. 25, 2023

(54) COMPOSITIONS AND METHODS FOR SCAVENGING $H_2S$

(71) Applicant: RHODIA POLIAMIDA E ESPECIALIDADES SA, Sao Paulo (BR)

(72) Inventors: Eder Rissi Torres, Campinas (BR); Edson Leme Rodrigues, Pirassununga (BR); Victor Ferrão, São Paulo (BR)

(73) Assignee: RHODIA POLIAMIDA E ESPECIALIDADES S.A., São Paulo (BR)

( * ) Notice: Subject to any disclaimer, the term of this patent is extended or adjusted under 35 U.S.C. 154(b) by 0 days.

(21) Appl. No.: 16/493,051

(22) PCT Filed: Mar. 8, 2018

(86) PCT No.: PCT/IB2018/000221
§ 371 (c)(1),
(2) Date: Sep. 11, 2019

(87) PCT Pub. No.: WO2018/092118
PCT Pub. Date: May 24, 2018

(65) Prior Publication Data
US 2020/0017753 A1  Jan. 16, 2020

Related U.S. Application Data

(60) Provisional application No. 62/471,523, filed on Mar. 15, 2017.

(51) Int. Cl.
| | | |
|---|---|---|
| *E21B 41/02* | (2006.01) | |
| *C09K 8/54* | (2006.01) | |
| *C02F 1/68* | (2023.01) | |
| *C09K 8/035* | (2006.01) | |
| *C09K 8/86* | (2006.01) | |
| *C10M 159/12* | (2006.01) | |
| *C02F 101/10* | (2006.01) | |
| *C10N 30/12* | (2006.01) | |

(52) U.S. Cl.
CPC .............. *C09K 8/54* (2013.01); *C02F 1/683* (2013.01); *C09K 8/035* (2013.01); *C09K 8/86* (2013.01); *C10M 159/12* (2013.01); *E21B 41/02* (2013.01); *C02F 2101/101* (2013.01); *C09K 2208/20* (2013.01); *C10N 2030/12* (2013.01)

(58) Field of Classification Search
CPC ...... C09K 2208/20; C09K 8/54; C09K 8/035; E21B 41/02; C10M 159/12; C10N 2030/12; C02F 2101/101
See application file for complete search history.

(56) References Cited

U.S. PATENT DOCUMENTS

| | | | | |
|---|---|---|---|---|
| 2,713,029 A * | 7/1955 | Fuller | ................... | C09K 8/206 507/110 |
| 2,713,030 A * | 7/1955 | Brink | ................... | C09K 8/035 507/110 |
| 3,035,042 A * | 5/1962 | Hoyt | ................... | C09K 8/035 530/506 |
| 3,301,323 A * | 1/1967 | Parsons | ................ | E21B 21/068 175/66 |
| 3,928,211 A * | 12/1975 | Browning | ............... | C09K 8/16 507/145 |
| 3,989,810 A * | 11/1976 | Toyama | .............. | B01D 53/523 423/576.7 |
| 4,540,561 A * | 9/1985 | Olson | ................ | B01D 53/1468 423/576.5 |
| 4,902,489 A * | 2/1990 | Watanabe | ................. | A61L 9/01 423/228 |
| 5,296,007 A | 3/1994 | Clough et al. | | |
| 5,482,118 A * | 1/1996 | Clough | .................... | C09K 8/54 160/270 |
| 5,656,070 A * | 8/1997 | Clough | .................... | C09K 8/54 106/14.41 |
| 8,734,637 B2 * | 5/2014 | Taylor | ................ | B01D 53/1468 208/208 R |
| 10,633,602 B2 * | 4/2020 | Solomon | ................ | C10G 29/20 |
| 11,292,971 B2 * | 4/2022 | Solomon | ................ | C04B 26/26 |
| 2008/0277351 A1 * | 11/2008 | Harman | ................. | C02F 1/286 210/691 |
| 2011/0197640 A1 * | 8/2011 | Harman | ................. | B01D 53/02 71/23 |
| 2012/0152836 A1 | 6/2012 | Powell et al. | | |

(Continued)

FOREIGN PATENT DOCUMENTS

| | | |
|---|---|---|
| CA | 2903494 A1 | 9/2014 |
| GB | 1003119 A | 9/1965 |
| JP | 2004049344 A * | 2/2004 |

OTHER PUBLICATIONS

Translation of JP 2004049344A (Year: 2004).*
Translation of Tables and data from JP 2004049344A (Year: 2014).*
Holtzapple, LIGNIN, 2003, Encyclopedia of Food Sciences and Nutrition (as present on pp. 3-4 of "Coniferyl Alcohol" from Science Direct) (Year: 2003).*
David W. Wakerley et al: "Solar-driven reforming of lignocellulose to H2 with a Cds/CdOx photocatalyst", Nature Enery, vol. 17021, Mar. 13, 2017 (Mar. 13, 2017), pp. 109, XP055482955, DOI: 10.1038/nenergy, 2017.21 p. 1-p. 5; figures.

(Continued)

*Primary Examiner* — Angela M DiTrani Leff
(74) *Attorney, Agent, or Firm* — Osha Bergman Watanabe & Burton LLP

(57) ABSTRACT

A method of treating a fluid, which method includes the steps of: (a) contacting a fluid containing at least one sulfide with a sulfide-reducing amount of a composition comprising an lignocellulosic liquor comprising one or more lignin-derived compounds and one or more hemicellulose sugar monomers and/or oligomers and (b) allowing the lignocellulosic liquor to react with at least a portion of the sulfide in the fluid.

17 Claims, No Drawings

(56) References Cited

U.S. PATENT DOCUMENTS

| | | |
|---|---|---|
| 2015/0000984 A1 | 1/2015 | McDaniel |
| 2015/0368540 A1 | 12/2015 | Monclin et al. |
| 2016/0362502 A1* | 12/2016 | Timbart ................. C09K 8/905 |
| 2017/0349820 A1* | 12/2017 | Agashe .................... C09K 8/54 |
| 2018/0105732 A1* | 4/2018 | Okocha .................... C02F 5/14 |

OTHER PUBLICATIONS

Fengmei, S. et al., "Study of biogas desulphurization by incomplete carbonated corn stalk biochar" Renewable Energy Resources, vol. 34, No. 8, pp. 1239-1245, 2016 (7 pages).

Office Action issued in related Chinese application No. 201880017965.8, dated Jun. 28, 2021 with English translation (16 pages).

* cited by examiner

COMPOSITIONS AND METHODS FOR SCAVENGING $H_2S$

This application is a U.S. national phase entry under 35 U.S.C. § 371 of International Application No. PCT/IB2018/000221, filed on Mar. 8, 2018, which claims priority to U.S. Provisional Application No. 62/471,523, filed on Mar. 15, 2017. The entire contents of these applications are explicitly incorporated herein by this reference.

BACKGROUND

In many industrial domains, and in particular in the drilling, production, transport, storage, and processing of crude oil and gas and in the storage of residual oil, hydrogen sulfide and/or sulfide and/or hydrogen sulfide ion are often present in the underground water removed with the crude oil, in the oil itself and in the gases associated with such water and oil. Hydrogen sulfide ($H_2S$) and its salts can also be found in pipelines from oil wells and gas pipe lines.

The presence of hydrogen sulfide is objectionable because it may react with hydrocarbons or fuel system components. Besides, hydrogen sulfide gas generates highly acidic environments to which metallic surfaces become exposed. Corrosion can occur in pipelines from oil wells and in metallic equipment due to the presence of hydrogen sulfide and its salts. Droplets of water can form on the interior of gas pipe lines or on the surface of equipment and in the presence of sulfides can give rise to corrosive conditions.

Further, hydrogen sulfide emits highly noxious odors. Uncontrolled emissions of hydrogen sulfide gives rise to severe health hazards. Hydrogen sulfide is, in addition, a flammable gas which burns with a blue flame, giving rise to sulfur dioxide, a highly irritating gas with a characteristic odor. Mixtures of hydrogen sulfide and air in the explosive range may explode violently; since the vapors are heavier than air, they may accumulate in depressions or spread over the ground. Even a low level of exposure to the gas induces headaches and nausea, as well as possible damage to the eye. At higher levels, death can rapidly set in and countless deaths attributable to the build-up of sulfide in sewage systems have been recorded.

In the recovery of natural gases and in oil wells which utilize flooding operations, sulfide scavenger compounds are sometimes used to prevent or at least minimize corrosion. Moreover, it is well known that hydrogen sulfide is toxic and hence its removal is desirable. Efforts have been undertaken to find alternative compositions and methods which are cost effective and which are capable of removing hydrogen sulfide from such fluids, with minimum drawbacks to the operations.

In other industrial domains like tanning leather process treatments, wastewaters treatments, treatments of industrial gas stream, pulp and paper mills and lubricant additives production, hydrogen sulfide emissions also cause some above mentioned drawbacks and thus an environmentally-friendly solution for an efficient removal is also expected in those fields.

SUMMARY

In an embodiment, the present disclosure provides an environmentally-friendly sulfides scavenger, notably for the oil industry, in order to avoid the use of alkaline and/or nitrogenated organic compounds like HHTT, also known as MEA-triazine (from triazine family), which byproducts are potentially responsible for corrosion of metallic structures and piping systems clogs. Reducing sugars, notably chelated with a metal ion such as iron, like ferric fructose or ferrous sucrose, have been described in US2015/0000984A1 to be $H_2S$ scavengers for eliminating or reducing concentrations of hydrogen sulfide in subterranean formations. However the efficiency of reducing sugars alone is not satisfying and the use of metals leads to the formation of metal sulfides, which is not recommended as the subterranean medium is acid and the produced metal sulfide may release again hydrogen sulfide in acidic conditions. Besides the potential $H_2S$ releasing issue, the use of metals is not recommended due to its potential toxicity (especially Zn, which is very toxic to marine life forms).

Lignin containing polymers are also known as organic dispersants for metallic hydrogen sulfide scavengers in drilling applications. U.S. Pat. No. 3,928,211 is describing them, and in particular desugared ones like desugared polymerized sodium lignosulfate. First of all, in this document lignin is used as a dispersant for metallic compounds which are indeed the actives for $H_2S$ scavenging process. Even if the use of lignin alone as $H_2S$ scavenger is not described in this document, this solution cannot be considered because it may create precipitation of Sulfur in the medium, thus leading to severe corrosion issues.

In another embodiment, the present disclosure provides an environmentally-friendly $H_2S$ scavenger for the tanning leather process industry, in order to avoid the $H_2S$ releasing when the pH is reduced in the tanning process. Sulfides are used in the unhairing and liming steps with the proposal of hair removal and to alter the properties of the skin protein (collagen). After its recovery in the process, the residual sulfides can lead to serious safety issues when the pH is reduced in the later stages and, sulfites are converted into hydrogen sulfide. In tanneries and effluent treatment plants thereof, the sulfide content results from the use of sodium sulfide and sodium hydrosulfide in the unhairing and liming steps. Alkaline sulfides in tannery wastewater can be converted to hydrogen sulfide if the pH is lower than 8.0, resulting in release of $H_2S$ gas. This $H_2S$ releasing process contributes to VOC emission in the leather industry. One of the current ways to reduce this $H_2S$ releasing is based on the use of oxidizing chemical agents. However, in this way relatively high energy is required and/or high chemical and disposal costs are involved; besides environmental problems which constitute important drawbacks of current treatment. Although, biological treatment of tannery wastewater is more cost effective as compared to physicochemical methods, the anaerobic treatment, the most effective, biologic treatment, shows restrictions in its application. Various phototrophes and chemotrophes have been used for sulfide removal but requirement of light source is the major problem in case of phototrophes.

In still another embodiment, the present disclosure provides an environmentally-friendly $H_2S$ scavenger for the water treatment industry, notably the treatment of wastewaters. One of the more frustrating problems of $H_2S$ development from domestic and industrial wastewaters in collection systems is odors, besides its high toxicity. Odor problems often are resolved by chemical addition. Chlorine compounds such as bleach, sodium hypochlorite, calcium hypochlorite and ferric chloride are examples of chemicals that are effective in controlling $H_2S$ in wastewater collection systems. However, in general, high dosages are required so that a satisfactory level of efficiency is achieved, raising operational costs, treatment complexity and leading to the addition of high amounts of metals such as Fe and Ca into the system.

Last, it is also an embodiment of the invention to provide an environmentally-friendly $H_2S$ scavenger for the treatment of lubricant additives streams issued from the production of lubricants, because the production process may lead to $H_2S$ releasing issues. The environmentally-friendly $H_2S$ scavenger according to the present invention is a composition comprising a lignocellulosic liquor comprising one or more lignin-derived compounds and one or more hemicellulose sugar monomers and/or oligomers.

The $H_2S$ scavenging composition according to the present invention is advantageously a metal-free and nitrogen-free composition.

The present invention is thus directed to the use of a composition comprising a lignocellulosic liquor comprising one or more lignin-derived compounds and one or more hemicellulose sugar monomers and/or oligomers for reducing the sulfide content of a fluid containing at least one sulfide.

The present invention is in other words directed to the use of a composition comprising a lignocellulosic liquor comprising one or more lignin-derived compounds and one or more hemicellulose sugar monomers and/or oligomers as sulfide scavenging agent, notably as hydrogen sulfide, sulfide and/or hydrogen sulfide ion scavenging agent.

The present disclosure provides methods of treating a fluid that include the steps of: (a) contacting a fluid containing at least one sulfide with a sulfide-reducing amount of a composition comprising a liquor prepared from pretreatment of lignocellulosic biomass enriched in lignin-derived compounds and one or more hemicellulose sugar monomers and/or oligomers and (b) allowing the liquor to react with at least a portion of the sulfide in the fluid.

Definitions

"lignocellulosic liquor" or "liquor" means a liquid composition, advantageously prepared from lignocellulosic biomass, mainly composed of compounds derived from hemicelluloses, cellulose and lignin.

"lignin-derived compounds" means heterogeneous oligomers and/or monomers comprising at least one of the three phenylpropane units (a.k.a. monolignols): p-coumaryl alcohol, coniferyl alcohol and sinapyl alcohol of the following formulas:

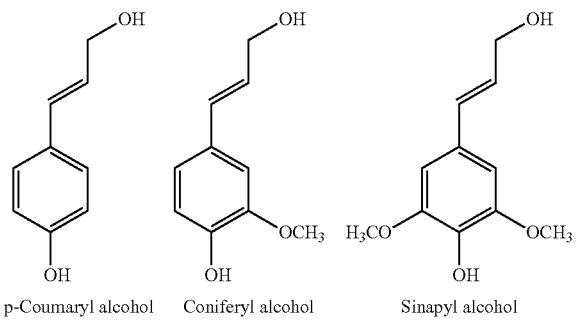 [SMILES: OC/C=C/c1ccc(O)cc1 ; COc1cc(/C=C/CO)ccc1O ; COc1cc(/C=C/CO)cc(OC)c1O]

p-Coumaryl alcohol    Coniferyl alcohol    Sinapyl alcohol

The monolignol composition of lignin varies as a function of its origin (hardwood, softwood or grass) and the method used for its extraction from biomass.

"hemicellulose sugar monomers and/or oligomers" means monomers and/or oligomers compounds that enter in the structure of hemicelluloses, which are heterogeneous polysaccharides constituted mainly by some of following sugar monomers: xylose, mannose, galactose, rhamnose, and arabinose. Hemicelluloses are a group of plant-derived heteropolysaccharides associated with cellulose and lignin. The most common hemicelluloses are: xylan, glucuronoxylan, arabinoxylan, glucomannan and xyloglucan. The composition of hemicelluloses in the biomass varies as a function of its origin (hardwood, softwood or grass).

"Sulfides" or "sulfide" has to be understood as covering "hydrogen sulfide", which is a gas with the chemical formula $H_2S$, and/or "sulfide ion" which is an inorganic anion of sulfur with the chemical formula $S^{2-}$ or a compound containing one or more $S^{2-}$ ions and/or "hydrogen sulfide ion", which is an inorganic anion with the chemical formula $HS^-$. The sulfide and hydrogen sulfide ions can be in the form of a mixture of ions species and/or any of their salts. The ratio of these two ions in the medium depends on the pH. Mercaptans are excluded from the definition of sulfides.

For the avoidance of doubt, the sulfide scavenging effect claimed in the present invention is directed only to sulfide removal ($H_2S$, $S^{2-}$ and $HS^-$) that are present in condensate (liquid) or gas fluid but not chemically linked to the fluid. In other words, the sulfide scavenging effect that is presently claimed is not modifying the fluid in its chemical structure, in particular it does not remove the sulfur chemically linked to the carbon chains of the fluid, if any.

By "metal-free", it has to be understood that the composition does not contain any metal as metallic compound, metal complex or metal salts except minor amounts of sodium or calcium ions like sodium and/or calcium acetate and/or carbonate and/or sodium and/or calcium salts of lignin that maybe found as residues from production process or due to pH adjustments, not exceeding 10% (w/w).

By "nitrogen-free" it has to be understood that the composition does not contain nitrogenated compounds, in particular the composition is free of amines. Minor amounts of nitrogenated compounds maybe found from production process, limited to maximum 1% of total weight of the composition.

"enriched" means naturally or artificially containing a substance.

"Fluid" means liquid and/or gas stream/medium, preferably the liquid medium is an aqueous solution.

DETAILED DESCRIPTION

In general, the present disclosure includes compositions for and methods of removing sulfides from fluids using a sulfide-reducing amount of a lignocellulosic liquor that includes one or more lignin-derived compounds and one or more hemicellulose sugar monomers and/or oligomers. The presence of the combination of the one or more lignin-derived compounds together with one or more hemicellulose sugar monomers and/or oligomers is important to achieve the performance in reducing sulfides concentration up to an acceptable level. As demonstrated below in the experimental part, the use of lignin alone is not satisfying because it generates precipitation in the medium and that causes scale issues or corrosion because of the potential presence of Sulfur. Also the use of sugars alone is not sufficient to achieve the expected performance. The combination of both compounds brings surprisingly an optimized solution to the problem of sulfide presence in many fluids.

The quantity of lignin-derived compounds may vary from 0.5 to 50% by weight based on the total weight of the composition, preferably it ranges from 2 to 30%, even more preferably from 4 to 15%. The lignin-derived compounds can be naturally present, thus in an amount resulting from the natural content after treatment of the feedstock as described below. In this case the content will vary according to the origin of the feedstock, but generally ranges from 0.5 to 30% by weight based on the total weight of the composition. Alternatively, the composition can be enriched in lignin-derived compounds, by adding lignin sources to the feedstock before or after treating the feedstock as described below.

The quantity of hemicellulose sugar monomers and/or oligomers may vary from 5 to 80% by weight based on the total weight of the composition, preferably it ranges from 10 to 60%, even more preferably from 20 to 50%. The hemicellulose sugar monomers and/or oligomers can be naturally present, thus in an amount resulting from the natural content after treatment of the feedstock as described below. In this case the content will vary according to the origin of the feedstock, but generally ranges from 5 to 60% by weight based on the total weight of the composition. Alternatively, the composition can be enriched in hemicellulose sugar monomers and/or oligomers, by adding sugar sources to the feedstock before or after treating the feedstock as described below.

The mass ratio of lignin-derived compounds: hemicellulose sugar monomers and/or oligomers in the composition according to the invention is advantageously ranging from 0.5:80 to 50:5, preferably 2:60 to 30:10, and more preferably 4:50 to 15:20.

The lignocellulosic liquor can be prepared using any known technique for treating an initial feedstock. In some embodiments, the initial feedstock for preparing the lignocellulosic liquor is lignocellulosic biomass. In an embodiment, the lignocellulosic biomass is selected from forestry, agricultural and agro-industrial wastes. In an embodiment, such wastes are selected from sawdust/wood, poplar trees, sugarcane bagasse, waste paper, brewer's spent grains, switchgrass, and straws, stems, stalks, leaves, husks, shells and peels from cereals such as rice, wheat, corn, sorghum and barley, among others. Advantageously, the composition according to the invention comes from wood or sugarcane bagasse. More specifically, the liquor can be produced in industrial plants that produce ethanol of second generation or wood biorefineries or in paper and cellulose industries.

In an embodiment, the lignocellulosic liquor is extracted from lignocellulosic biomass using any of the various pretreatment technologies or combinations thereof. In an embodiment, pretreatment technologies are selected from thermal, thermo-chemical, chemical, biological, mechanical, ultrasound, microwave, and combinations thereof. The combination of technologies and/or processing conditions can be adjusted to impact the composition of the liquor mixture, lignin-derived compounds and hemicellulose sugar monomers and/or oligomers to improve suitability for use as $H_2S$ scavengers.

The lignocellulosic liquor extracted via pretreatment can be subjected to a second hydrolysis pretreatment under controlled conditions in order to obtain a mixture of monomers and oligomers of sugar and decomposition products. During the depolymerisation/hydrolysis of hemicellulose resulting in the formation of monomers and oligomers of sugar; the formation of some by-products like furfural and hydroxymethylfurfural can occur.

In an embodiment, the lignocellulosic liquor is prepared via hydrothermal pretreatment of a lignocellulosic material from the initial feedstock and this liquor is submitted to acid hydrolysis treatment. In an embodiment, the one or more hemicellulose sugar monomers and/or oligomers are extracted from sugarcane bagasse. In an embodiment, the one or more hemicellulose sugar monomers are selected from xylose, glucose, and arabinose. Various hemicellulose sugar monomers can be present in the lignocellulosic liquor. In another embodiment, the one or more hemicellulose sugar oligomers are selected from oligomeric combinations of the sugar monomers, like xylooligomers and others.

In an embodiment, lignocellulosic liquor extracted using a pretreatment technique is further subjected to one or more purification or concentration steps selected from filtration, evaporation, adsorption, and combinations thereof, followed by a formulation step, where other chemicals maybe added to prepare multifunctional products; to enhance its shelf life (with the addition of preservatives) or to make industrial application easier. In an embodiment, the present disclosure includes a method of treating a fluid, wherein the method comprises the steps of: (a) contacting a fluid containing at least one sulfide with a sulfide-reducing amount of a composition comprising a lignocellulosic liquor comprising one or more lignin-derived compounds and one or more hemicellulose sugar monomers and/or oligomers; and (b) allowing the lignocellulosic liquor to react with at least a portion of the sulfide in the fluid.

In another embodiment, there is a method of treating a fluid that comprises the steps of: (a) contacting a fluid containing at least one sulfide that is present at a first concentration with a composition comprising a lignocellulosic liquor comprising one or more lignin-derived compounds and one or more hemicellulose sugar monomers and/or oligomers; and (b) allowing the lignocellulosic liquor to react with sulfide in the fluid to reduce the concentration of sulfide to a second concentration that is lower than the first concentration.

In some embodiments, the composition comprising a lignocellulosic liquor includes an aqueous phase.

The composition of the invention is preferably at a pH ranging from 1 to 9. Even more preferably the composition according to the invention does not present alkaline character in order to avoid precipitation in the medium and issues with scale in the application, preferably the composition according to the invention presents a pH ranging from 3 to 7.

In some embodiments, the lignocellulosic liquor further includes furfural and/or hydroxymethylfurfural. In some embodiments, the lignocellulosic liquor composition further includes one or more ferrous compounds and/or salts thereof. In an embodiment, the ferrous salt is ferrous sulfate. However, a preferred embodiment is a metal free composition as explained above in the definitions.

In some embodiments, the composition comprising the lignocellulosic liquor further includes an alcoholic component. In an embodiment, the alcoholic component is selected from monohydric alcohols, dihydric alcohols, polyhydric alcohols, and combinations thereof. In another embodiment, the alcohol is selected from alkanols, alcohol alkoxylates, and combinations thereof. In another embodiment, the alcohol is selected from methanol, ethanol, isopropanol, butanol, propylene glycol, ethylene glycol (MEG), polyethylene glycol, and combinations thereof. The use of the alcohol helps adjusting the viscosity of the composition, by reducing it when necessary to make the industrial application easier. The quantity of alcohol to be introduced is thus varying from 0 to 30% by weight based on the total weight of the composition, preferably 5 to 15%.

In some embodiments, the composition comprising the lignocellulosic liquor further comprises other additives like biocidal components like phosphonium sulphates in a proportion not exceeding 80% by weight based on the total weight of the composition. The biocidal component is preferably a phosphorus containing compound and is most preferably a Tetrakishydroxymethyl phosphonium sulphate (THPS) solution.

Also presented herein is a method of treating a fluid, wherein the method comprises the steps of: (a) introducing a composition that includes a lignocellulosic liquor comprising one or more lignin-derived compounds and one or more hemicellulose sugar monomers and/or oligomers into at least a portion of a subterranean formation; and (b) allowing the lignocellulosic liquor to react with at least a portion of the sulfide in the fluid.

As used herein, the term "subterranean formation" includes areas below exposed earth as well as areas below earth covered by water such as sea or ocean water. The fluid is advantageously a fluid from oil and gas extraction, processing fluid in refineries, distribution and export pipelines and storage tanks, notably a well treatment fluid, a well surface treatment fluid and a drilling fluid.

In an embodiment, the fluid is a well surface treatment fluid. In another embodiment, the fluid is a drilling fluid. In yet another embodiment, the fluid is a well treatment fluid.

Optionally, the treatment fluid further includes one or more additives. In an embodiment, the fluid includes one or more additives selected from corrosion inhibitors, foamers, rheology modifiers, surfactants, oxygen scavenger, iron control agents, clay stabilizers, calcium sulfate inhibitors, scale inhibitors, mutual solvents, non-emulsifiers, anti-slug agents, biocides, emulsion breakers and combinations thereof.

Also provided is a method of drilling that comprises the steps of: (a) using a drilling fluid comprising a lignocellulosic liquor comprising one or more lignin-derived compounds and one or more hemicellulose sugar monomers and/or oligomers to drill at least a portion of a well bore penetrating at least a portion of a subterranean formation; and (b) allowing the lignocellulosic liquor to react with at least a portion of sulfide in the drilling fluid.

In other embodiments, the fluid is a tanning leather process treatment fluid or tannery wastewater fluid. In another embodiment, the fluid that need to be treated to remove sulfide compounds is any other industrial wastewaters treatment fluid. In yet another embodiment, the fluid is a lubricant additive fluid, advantageously a lubricant additive aqueous fluid.

Also presented herein is a method of treating a fluid, wherein the method comprises the steps of: (a) introducing a composition that includes a lignocellulosic liquor comprising one or more lignin-derived compounds and one or more hemicellulose sugar monomers and/or oligomers into a step of a leather treatment process; and (b) allowing the lignocellulosic liquor to react with at least a portion of the sulfide in the fluid.

Also presented herein is a method of treating a fluid, wherein the method comprises the steps of: (a) introducing a composition that includes a lignocellulosic liquor comprising one or more lignin-derived compounds and one or more hemicellulose sugar monomers and/or oligomers into a step of a waste waters treatment process or polluted gas stream; and (b) allowing the lignocellulosic liquor to react with at least a portion of the sulfide in the fluid.

Also presented herein is a method of treating a fluid, wherein the method comprises the steps of: (a) introducing a composition that includes a lignocellulosic liquor comprising one or more lignin-derived compounds and one or more hemicellulose sugar monomers and/or oligomers into a step of a lubricant additives process; and (b) allowing the lignocellulosic liquor to react with at least a portion of the sulfide in the fluid. While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present disclosure will further be described by reference to the following examples. The following examples are merely illustrative and are not intended to be limiting.

EXPERIMENTAL SECTION

Part A

A1—Preparation of Sugarcane Liquor

The sugarcane liquor was obtained through the following treatments: (i) the sugarcane bagasse was subjected to a hydrothermal pre-treatment at 160° C. for 1 h; (ii) the liquor generated in the first step was subjected to acid hydrolysis at 120° C. for 30 minutes; (iii) the liquor generated was filtered and the pH adjusted to 5.0.

A2—Performance of $H_2S$ Scavengers

First, a control experiment was conducted—i.e. a blank system, without any scavenger. The device used to perform the experiment included a glass tube for the generation of $H_2S$ connected to two glass tubes in series to capture the generated gas. $H_2S$ was generated by the reaction between FeS and HCl. The amount of $H_2S$ generated was quantified by the FeS uptake. In the first capture glass tube was placed the solution with the scavenger to be evaluated (or without scavenger, in the case of control experiment), and in the second capture glass tube a solution of NaOH. The generation of $H_2S$ was performed at ambient temperature at a controlled rate compatible with the size of the capture system employed.

Three scavengers were evaluated. A commercial product commonly employed, MEA-Triazine (hexahydro-1,3,5-tris (hydroxyethyl)-s-triazine or HHTT), and two liquors extracted from sugarcane bagasse with different concentrations of sugar (14 and 28 g/l). The liquors used in this evaluation were obtained according to the treatment described in Example A1. A stoichiometric amount of scavenger based on the generated H$_2$S was employed for the triazine and for the liquors (14 and 28 g/l of sugar). Experiments were performed with different temperatures. The solution from the second glass tube, with the amount of H$_2$S not scavenged by the first glass tube with the scavenger, was analyzed via potentiometric titration by precipitation with the following results:

TABLE 1

Performance of H$_2$S Scavengers

| Scavenger | pH | Temperature (° C.) | Performance after about 1 minute/% H2S scavengered |
|---|---|---|---|
| MEA-Triazine | 5 | 20 | 33 |
| | 5 | 65 | 41 |
| Liquor (14 gL−1 sugars) | 5 | 20 | 6 |
| | 5 | 65 | 10 |
| | 5 | 90 | 39 |
| Liquor (28 gL−1 sugars) | 5 | 20 | 39 |
| | 5 | 65 | 46 |
| | 5 | 90 | 61 |

A3—Performance of H$_2$S Scavengers

A control experiment was conducted as described in Example A2.

Two scavengers were evaluated. A liquor extracted from sugarcane as described in Example A1 with 14 g/l of sugars was used as scavenger and its performance was compared with the addition of 7 g/l of iron sulfate in the liquor. The liquor has a stoichiometric amount of scavenger based on the generated H$_2$S employed and the liquor plus iron sulfate has the double stoichiometry.

TABLE 2

Performance of H$_2$S Scavengers

| Scavenger | pH | Temperature (° C.) | Performance after about 1 min/% H2S scavengered |
|---|---|---|---|
| Liquor (14 gL−1 sugars) | 5 | 20 | 6 |
| | 5 | 65 | 10 |
| Liquor (14 gL−1 sugars) + FeSO4 | 5 | 20 | 15 |
| | 5 | 65 | 18 |

Besides the better performance as scavenger when combining Liquor with FeSO4, there is a drawback related to the formation of FeS, which may stabilize emulsions between water and oil and may release H2S when in contact with acids.

Part B

B1—Preparation of Sugarcane Liquor (SL)—37% of Sugars and 6% of Lignin

The sugarcane liquor (SL) was obtained as described in Example A1 above, followed by a concentration step, increasing the concentration of sugars and lignin.

B2—Preparation of 90% SL+10% MEG, pH=5.5

The 90% SL+10% MEG, pH=5.5 was prepared by blending 90% (in weight) the SL prepared as described in Example B1 with 10% of monoethylene glycol.

B3—Preparation of 90% SL+10% MEG, pH=8.9

The 90% SL+10% MEG, pH=8.9 was prepared by adding NaOH to the sample prepared as described in Example B2 until pH=8.9 being reached.

B4—Preparation of Wood Liquor:

The lignocellulosic liquor was obtained from pine wood in two steps: hydrothermal and diluted acid hydrolysis. The hydrothermal pretreatment was conducted using a Parr stirred reactor. Water and wood chips were placed in the reactor using a mass ratio of 20:1. Reaction medium temperature was increased at heating rate of 2.5° C./min up to 180° C. and kept at this temperature for one hour. After cooling, the liquid phase was separated and subjected to a second treatment: acid hydrolysis. The hydrolysis reaction was undertaken in same reactor using dilute sulfuric acid (1% wt). Reaction medium temperature was increased at heating rate of 2.5° C./min up to 120° C. and kept at this temperature for one hour.

C1—Preparation of Xylose at 37% pH=5.5

Xylose at 37% pH=5.5 was prepared by adding 37 g of xylose to 63 g of distilled water. pH was adjusted to 5.5 by adding acetic acid.

C2—Preparation of Sugarcane Liquor Free of Lignin (SL Free of Lignin):

The liquor obtained from sugarcane bagasse (SL) of example B1 was treated with activated charcoal in order to remove compounds derived from lignin. The liquor was placed in a stirred reactor with activated charcoal (5% wt) for 3 hours. The activated charcoal was removed of reaction medium by filtration.

C3—Preparation of Lignin Solution at 6%:

The liquor obtained from sugarcane bagasse (SL) of example B1 was treated with Acetic acid up to pH=2.5 to precipitate compounds derived from lignin. The solid was separated from the aqueous medium by filtration, followed by a drying step. The dried solid was solubilized in water and pH was adjusted to 7.5 to keep it in solution.

Performance of H$_2$S Scavengers

First, a control experiment was conducted—i.e. a blank system, without any scavenger. The device used to perform the experiment included a glass tube for the generation of H$_2$S connected to two glass tubes in series to capture the generated gas. H$_2$S was generated by the reaction between FeS and HCl. In the first capture glass tube was placed the solution with the scavenger to be evaluated (or without scavenger, in the case of blank test) and in the second capture glass tube a solution of NaOH to ensure that there is no releasing H$_2$S in the atmosphere. The generation of H$_2$S was performed at ambient temperature at a controlled rate compatible with the size of the capture system employed, with different reaction time. The amount of H$_2$S generated and scavenged was quantified by sparging nitrogen to the first tube with the gas captured. The mixture of nitrogen and H$_2$S passed through a H$_2$S measuring tube, quantifying the amount of H$_2$S present in the tube. Performance is expressed as the % of H$_2$S removed when in contact with the scavenger, ie, {[H$_2$S concentration in control/blank]−[H$_2$S concentration with scanvenger]}/[H$_2$S concentration in control/blank].

Four scavenger formulations and three comparative examples were evaluated.

TABLE 3

Compositions and Performances of H$_2$S Scavengers

| Sample | Composition | Performance t = 5 min | Precipitation |
|---|---|---|---|
| B1 | Sugarcane liquor with 37% of sugars and 6% of lignin (SL), pH = 5.5 | 30% | No |

TABLE 3-continued

Compositions and Performances of H$_2$S Scavengers

| Sample | Composition | Performance t = 5 min | Precipitation |
|---|---|---|---|
| B2 | 90% SL + 10% MEG, pH = 5.5 | 24% | No |
| B3 | 90% SL + 10% MEG, pH = 8.9 | 27% | Yes |
| B4 | Wood liquor with 37% of sugars and 10% of lignin pH = 5.0 | 33% | No |
| C1 | Xylose at 37% pH = 5.5 | 13% | No |
| C2 | SL free of lignin pH = 5.5 | 16% | No |
| C3 | Lignin at 6% pH = 7.5 | 13% | Yes |

*MEG = monoethyleneglycol

CONCLUSION

It can be seen from the above results that the combination of sugars and lignin derived compounds is key to achieve both the performance and avoid precipitation in the medium.

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

The invention claimed is:

1. A method of treating a fluid comprising the steps of:
   (a) contacting a fluid containing at least one sulfide, wherein said sulfide comprises hydrogen sulfide and/or hydrogen sulfide ion, with a sulfide-reducing amount of a composition comprising lignocellulosic liquor comprising one or more lignin-derived compounds and one or more hemicellulosic sugar monomers and/or oligomers, wherein the one or more lignin derived compound comprises heterogeneous oligomers and/or monomers comprising at least one of p-coumaryl alcohol, coniferyl alcohol, and sinapyl alcohol and the one or more lignin derived compounds are present in an amount of 0.5 to 50% by weight based on total weight of the composition; and
   (b) allowing the lignocellulosic liquor to react with at least a portion of the sulfide in the fluid, wherein the pH of the composition ranges from 1 to 7.

2. The method of claim 1, wherein the at least one sulfide is present at a first concentration in step (a); and in step (b), the concentration of sulfide is reduced to a second concentration that is lower than the first concentration.

3. The method according to claim 1, wherein the composition is metal free.

4. The method according to claim 1, wherein the composition is nitrogen free.

5. The method according to claim 1, wherein the lignocellulosic liquor is extracted from lignocellulosic biomass.

6. The method according to claim 5, wherein the lignocellulosic biomass is selected from the group consisting of forestry wastes, agricultural wastes, Agro-industrial wastes, and combinations thereof.

7. The method according to claim 5, wherein the lignocellulosic biomass is selected from the group consisting of sawdust/wood, poplar trees, sugarcane bagasse, waste paper, brewer's spent grains, switchgrass, straws, stems, stalks, leaves, husks, shells, peels from cereals, and combinations thereof.

8. The method according to claim 1, wherein the one or more hemicellulose sugar monomers are selected from the group consisting of xylose, glucose, and arabinose.

9. The method according to claim 1, wherein the one or more hemicellulose sugar oligomers are selected from the group consisting, of oligomeric combinations of xylose, glucose, and arabinose.

10. The method according to claim 1, wherein the lignocellulosic liquor comprises an aqueous phase.

11. The method according to claim 1, wherein the lignocellulosic liquor further comprises an alcoholic component.

12. The method according to claim 1, wherein the hemicellulosic sugar is in excess relative to the lignin-derived compounds.

13. The method according to claim 1, wherein the fluid is a fluid from oil and gas extraction, processing fluid in refineries, distribution and export pipelines and storage tanks, a well treatment fluid, a well surface treatment fluid, a drilling fluid, a tanning leather process treatment fluid or tannery wastewater fluid, an industrial wastewaters treatment fluid or a lubricant additives fluid.

14. The method according to claim 1, wherein the lignocellulosic liquor comprises 5 to 80% by weight based on the total weight of the composition of the one or more hemicellulosic sugar monomers and/or oligomers.

15. The method according to claim 1, wherein mass ratio of the one or more lignin-derived compounds to the one or more hemicellulosic sugar monomers is between 0.5:80 to 50:5.

16. A method of treating a fluid comprising the steps of: (a) introducing a composition comprising a lignocellulosic liquor comprising one or more lignin-derived compounds and one or more hemicellulose sugar monomers and/or oligomers into at least a portion of a subterranean formation, wherein the one or more lignin derived compound comprises heterogeneous oligomers and/or monomers comprising at least one of p-coumaryl alcohol, coniferyl alcohol, and sinapyl alcohol and the one or more lignin derived compounds are present in an amount of 0.5 to 50% by weight based on total weight of the composition; and (b) allowing the lignocellulosic liquor to react with at least a portion of sulfide compounds in the fluid, wherein said sulfide compounds comprise hydrogen sulfide and/or hydrogen sulfide ion, wherein the pH of the composition ranges from 1 to 7.

17. A method of drilling comprising: (a) using a drilling fluid comprising a lignocellulosic liquor comprising one or more lignin-derived compounds and one or more hemicellulose sugar monomers and/or oligomers to drill at least a portion of a well bore penetrating at least a portion of a subterranean formation, wherein the one or more lignin derived compound comprises heterogeneous oligomers and/or monomers comprising at least one of p-coumaryl alcohol, coniferyl alcohol, and sinapyl alcohol and the one or more lignin derived compounds are present in an amount of 0.5 to 50% by weight based on total weight of the composition; and (b) allowing the lignocellulosic liquor to react with at least a portion of sulfide compounds in the drilling fluid, wherein said sulfide compounds comprise hydrogen sulfide and/or hydrogen sulfide ion, wherein the pH of the composition ranges from 1 to 7.

* * * * *